US012544668B2

(12) United States Patent
Lin et al.

(10) Patent No.: US 12,544,668 B2
(45) Date of Patent: Feb. 10, 2026

(54) COLLISION DATA PROCESSING METHOD AND APPARATUS, STORAGE MEDIUM, PROGRAM PRODUCT, AND ELECTRONIC DEVICE

(71) Applicant: Tencent Technology (Shenzhen) Company Limited, Shenzhen (CN)

(72) Inventors: Zhichao Lin, Shenzhen (CN); Yuan Guo, Shenzhen (CN); Jiahua Wan, Shenzhen (CN); Zhihao Chen, Shenzhen (CN); Xue Qin, Shenzhen (CN); Lei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 330 days.

(21) Appl. No.: 18/124,781

(22) Filed: Mar. 22, 2023

(65) Prior Publication Data

US 2023/0249076 A1 Aug. 10, 2023

Related U.S. Application Data

(63) Continuation of application No. PCT/CN2022/096731, filed on Jun. 2, 2022.

(30) Foreign Application Priority Data

Jun. 22, 2021 (CN) ......................... 202110694872.2

(51) Int. Cl.
*A63F 13/577* (2014.01)
*A63F 13/63* (2014.01)

(52) U.S. Cl.
CPC ............ *A63F 13/577* (2014.09); *A63F 13/63* (2014.09)

(58) Field of Classification Search
CPC ............................... A63F 13/577; A63F 13/63
(Continued)

(56) References Cited

U.S. PATENT DOCUMENTS

2002/0154128 A1* 10/2002 Zachmann ............. B25J 9/1664 345/474
2008/0034023 A1* 2/2008 Nagano ................... G06T 17/10 708/100

(Continued)

FOREIGN PATENT DOCUMENTS

CN 106204697 A 12/2016
CN 106503347 A 3/2017

(Continued)

OTHER PUBLICATIONS

Tencent Technology, Korean Office Action, KR Patent Application No. 10-2023-7031526, Apr. 10, 2025, 10 pgs.

(Continued)

*Primary Examiner* — Jin Ge
(74) *Attorney, Agent, or Firm* — Morgan, Lewis & Bockius LLP

(57) ABSTRACT

A collision data processing method and apparatus, a storage medium, a program product, and an electronic device are provided. The collision data processing method includes: determining a target collision body in a virtual scene, the target collision body being a convex polyhedron having vertices; obtaining distance relations between the respective vertices on the target collision body, the distance relations characterizing a shape feature of the target collision body; and transforming the target collision body into a regular geometry object according to the distance relations, wherein the regular geometry object is configured to obtain collision data of the target collision body when the target collision body collides with another virtual object in the virtual scene. This application solves a technical problem of relatively low
(Continued)

processing efficiency caused by a high operation difficulty in processing collision data in a related technology.

20 Claims, 8 Drawing Sheets

(58) Field of Classification Search
USPC .......................................................... 345/420
See application file for complete search history.

(56) References Cited

U.S. PATENT DOCUMENTS

| | | | | |
|---|---|---|---|---|
| 2010/0251185 | A1* | 9/2010 | Pattenden | A63F 13/52 715/849 |
| 2014/0200863 | A1 | 7/2014 | Kamat et al. | |
| 2024/0014223 | A1 | 1/2024 | Huang et al. | |

FOREIGN PATENT DOCUMENTS

| | | | |
|---|---|---|---|
| CN | 110232741 | A | 9/2019 |
| CN | 110765565 | A | 2/2020 |
| CN | 111360824 | A | 7/2020 |
| CN | 111429581 | A | 7/2020 |
| CN | 111773723 | A | 10/2020 |
| CN | 111921202 | A | 11/2020 |
| CN | 112179602 | A | 1/2021 |
| CN | 112619152 | A | 4/2021 |
| CN | 112669434 | A | 4/2021 |
| CN | 113244622 | A | 8/2021 |
| JP | H 08315180 | A | 11/1996 |
| JP | 2003281561 | A | 10/2003 |
| JP | 2011165096 | A | 8/2011 |

OTHER PUBLICATIONS

Tencent Technology, WO, PCT/CN2022/096731, Aug. 17, 2022, 6 pgs.
Tencent Technology, IPRP, PCT/CN2022/096731, Dec. 14, 2023, 7 pgs.
Tencent Technology, ISR, PCT/CN2022/096731, Aug. 17, 2022, 2 pgs.
Tencent Technology, Singaporean Office Action, SG Patent Application No. 11202307022X, Dec. 16, 2025, 7 pgs.

* cited by examiner (a)

(b) Upper intersection (c) Lower intersection

COLLISION DATA PROCESSING METHOD AND APPARATUS, STORAGE MEDIUM, PROGRAM PRODUCT, AND ELECTRONIC DEVICE

CROSS-REFERENCE TO RELATED APPLICATION

This application is a continuation application of PCT Patent Application No. PCT/CN2022/096731, entitled "COLLISION DATA PROCESSING METHOD AND APPARATUS, STORAGE MEDIUM, PROGRAM PRODUCT, AND ELECTRONIC DEVICE" filed on Jun. 2, 2022, which claims priorities to Chinese Patent Application No. 202110694872.2, filed with the China National Intellectual Property Administration on Jun. 22, 2021 and entitled "COLLISION DATA PROCESSING METHOD AND APPARATUS, STORAGE MEDIUM, PROGRAM PRODUCT, AND ELECTRONIC DEVICE", all of which are incorporated herein by reference in their entirety.

FIELD OF THE TECHNOLOGY

This application relates to the field of computers, and in particular to a collision data processing method and apparatus, a storage medium, a program product and an electronic device.

BACKGROUND OF THE DISCLOSURE

Many interactions often occur between different virtual objects in a virtual game scene, and it is necessary to calculate collision data generated by a collision body corresponding to the above virtual object, so as to accurately control the virtual object according to a calculation result.

However, collision data of a related technology is usually produced in a graphic engine (such as 3dmax) and then imported into a game engine for use. An art cost of this manner is relatively large. The art cost will be higher if a relatively simple collision with high precision needs to be produced. In addition, a mesh of a model is directly used as a collision manner. A calculation result of this manner has a high accuracy, there are too many vertices of the mesh in the model, which will also cause a problem of relatively high consumption of data calculation. Consumption here includes: 1, search consumption for geometries in a three-dimensional space provided in a virtual game scene: Which collision bounding boxes are likely to be collided need to be found, and a smaller number of collision bounding boxes indicates lower consumption. 2, physical intersection consumption between the above geometries: A simpler geometry intersection indicates lower consumption. 3, physical use consumption: Less use indicates lower consumption.

That is, the consumption required to perform collision calculation on a virtual object collided with a virtual scene provided in the related technology is relatively high, so that an operation difficulty in processing collision data of a collision body corresponding to the virtual object increases, resulting in a problem of low processing efficiency.

SUMMARY

Embodiments of this application provide a collision data processing method and apparatus, a storage medium, a program product and an electronic device, which help to solve a technical problem of relatively low processing efficiency caused by a high operation difficulty in processing collision data in a related technology.

According to one aspect of embodiments of this application, a collision data processing method is performed by an electronic device. The method includes: determining a target collision body in a virtual scene, the target collision body being a convex polyhedron having vertices; obtaining distance relations between the respective vertices on the target collision body, the distance relations characterizing a shape feature of the target collision body; and transforming the target collision body into a regular geometry object according to the distance relations, wherein the regular geometry object is configured to obtain collision data of the target collision body when the target collision body collides with another virtual object in the virtual scene.

According to another aspect of embodiments of this application, a collision data processing apparatus is provided, including: a first determining unit, configured to determine a target collision body in a virtual scene, the target collision body being a convex polyhedron having vertices; a first obtaining unit, configured to obtain distance relations between the respective vertices on the target collision body, the distance relations characterizing a shape feature of the target collision body; and a first processing unit, configured to transform the target collision body into a regular geometry object according to the distance relations, wherein the regular geometry object is configured to obtain collision data of the target collision body when the target collision body collides with another virtual object in the virtual scene.

According to still another aspect of embodiments of this application, a non-transitory computer-readable storage medium is further provided, which stores a computer program that, when executed by a processor of an electronic device, causes the electronic device to implement the collision data processing method.

According to yet another aspect of embodiments of this application, an electronic device is further provided, including a memory and a processor, the memory storing a computer program that, when executed by the processor, causes the electronic device to implement the collision data processing method by using the computer program.

According to still yet another aspect of embodiments of this application, a computer program product is further provided, including computer instructions stored in a computer-readable storage medium, the computer instructions, when executed by a processor, causing the processor to implement the collision data processing method.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTION OF EMBODIMENTS

In order to make persons skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In the specification, claims, and accompanying drawings of this application, the terms "first", "second", and the like are intended to distinguish similar objects but do not necessarily indicate a specific order or sequence. It is to be understood that such used data is interchangeable where appropriate so that the embodiments of this application described here can be implemented in an order other than those illustrated or described here. Moreover, the terms "include", "has", and any variations thereof are intended to cover a non-exclusive inclusion. For example, a process, a method, a system, a product, or a device that includes a series of steps or units is not necessarily limited to those steps or units expressly listed, but may include other steps or units not expressly listed or inherent to these processes, methods, products or devices.

Figure 1:
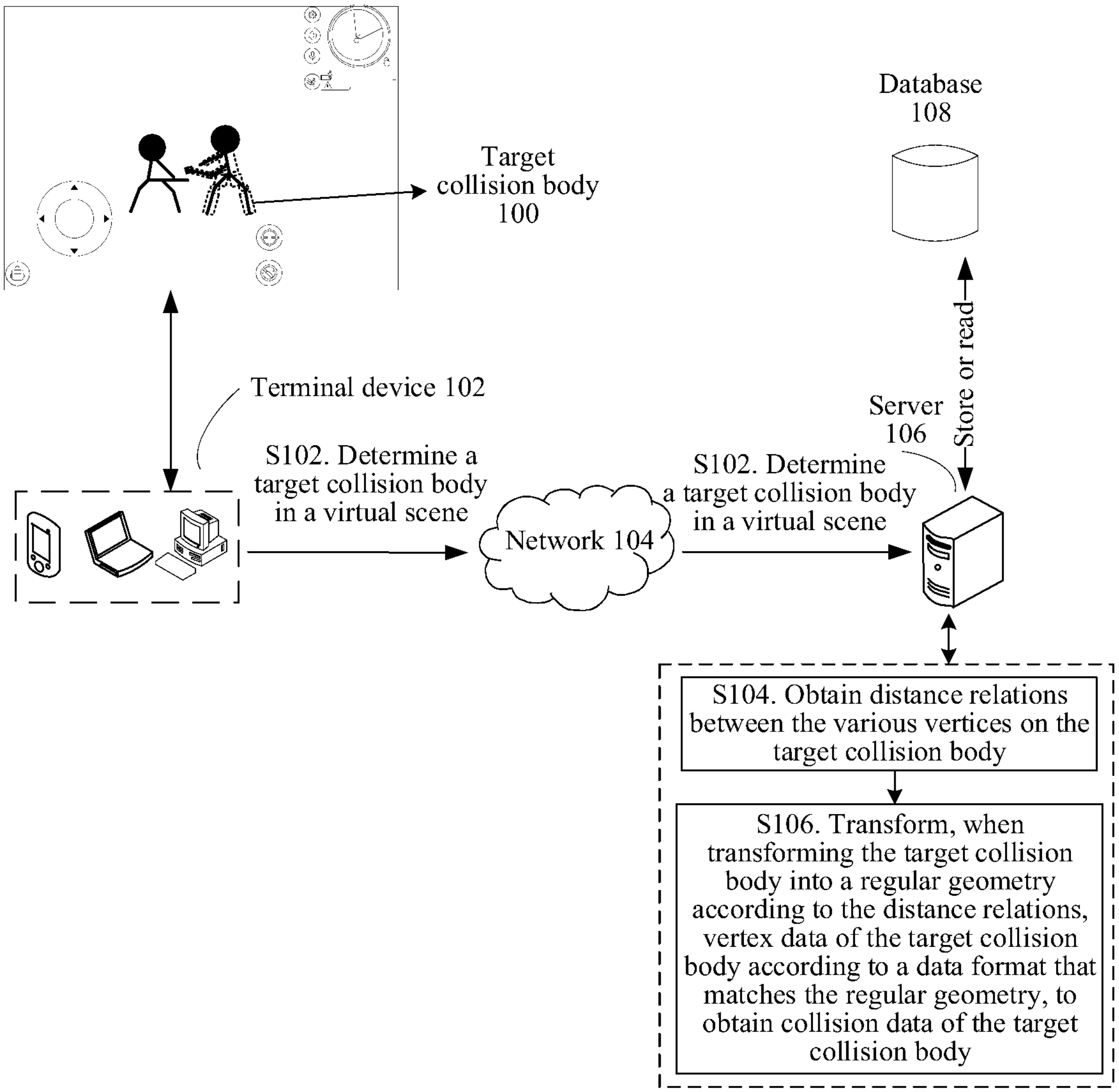
FIG. 1 is a schematic diagram of a hardware environment of an exemplary collision data processing method according to an embodiment of this application.

According to one aspect of embodiments of this application, a collision data processing method is provided. The above collision data processing method may be, but is not limited to, applied to a collision data processing system in a hardware environment as shown in FIG. 1. The collision data processing system may include, but is not limited to, a terminal device 102, a network 104, a server 106 and a database 108. A target client logged in using a target user account runs in the terminal device 102 (a game client used as the target client as shown in FIG. 1 is taken for example). The terminal device 102 includes a human-computer interaction screen, a processor and a memory. The human-computer interaction screen is configured to display a virtual scene (a virtual game scene in a game task will be presented in a display interface as shown in FIG. 1), and is also configured to provide a human-computer interaction interface to receive a human-computer interaction operation for controlling a virtual object. The virtual object can, but is not limited to, detect an interaction of physical properties of the virtual object occurring in the virtual scene through a target collision body set for the virtual object, namely, to detect whether a collision occurs between the target collision body and the virtual object. The processor is configured to generate an interaction instruction in response to the human-computer interaction operation, and send the interaction instruction to a server. The memory is configured to store relevant attribute data of the virtual object.

In addition, the server 106 includes a processing engine configured to perform a storage or reading operation on a database 108. Specifically, the processing engine is configured to determine, according to a distance relation, whether the target collision body can be transformed into a regular geometry object, transform, when it is determined that the target collision body can be transformed into a regular geometry object, vertex data of the target collision body according to a data format that matches the regular geometry object, and store same in the database 108. The processing engine is also configured to read the simply processed collision data from the database 108 for collision calculation.

A specific process includes following steps: In step S102, the server 106 obtains, by using a network 104, a target collision body 100 (which may be a collision body corresponding to a body part of the virtual object as shown in FIG. 1) in a virtual scene determined in the terminal device 102. The target collision body here is a convex polyhedron having vertices. Then, in step S104 to step S106, the server 106 obtains distance relations between the respective vertices on the target collision body; and transforms, when transforming the target collision body into a regular geometry object according to the distance relations, vertex data of the target collision body according to a data format that matches the regular geometry object, the regular geometry object being configured to obtain collision data of the target collision body when the target collision body collides with another virtual object in the virtual scene.

In this embodiment, after the target collision body in the virtual scene is determined, the distance relations of the various vertex on the target collision body are obtained. Whether the target collision body can be transformed into the regular geometry object with a simplified structure is then determined according to the distance relations. When it is determined to transform the target collision body into the regular geometry object, the vertex data of the above target collision body is transformed according to the data format that matches the regular geometry object, to obtain the simplified collision data of the target collision body. Thus, the target collision body with the complicated structure can be transformed into the regular geometry object with the simplified structure, and the collision data of the collision body is stored in the data format that matches the regular geometry object. The collision operation is performed using the simplified collision data, so as to reduce calculation consumption of the electronic device on collision data and achieve an effect of improving the processing efficiency of the electronic device on collision data, thereby overcoming the problem of low processing efficiency on collision data in the related technology.

In one embodiment, the above terminal device may be configured with a target client, and may include but is not limited to at least one of the following: a mobile phone (an Android mobile phone and an iOS mobile phone), a notebook, a tablet, a palmtop, mobile Internet devices (MIDs), a PAD, a desktop, a smart television, and the like. The target client may be a video client, an instant messaging client, a browser client, an education client, or the like, which is provided with a virtual object requiring physical interactions. The virtual object will perform an interactive collision operation by using a collision body. The foregoing network may include, but is not limited to, a wired network and a wireless network. The wired network includes: a local area network, a metropolitan area network, and a wide area network. The wireless network includes: Bluetooth, WiFi, and other networks that achieve wireless communication. The server may be a single server, a server cluster composed of a plurality of servers, or a cloud server The foregoing description is merely an example, and this is not limited in this embodiment.

Figure 2:
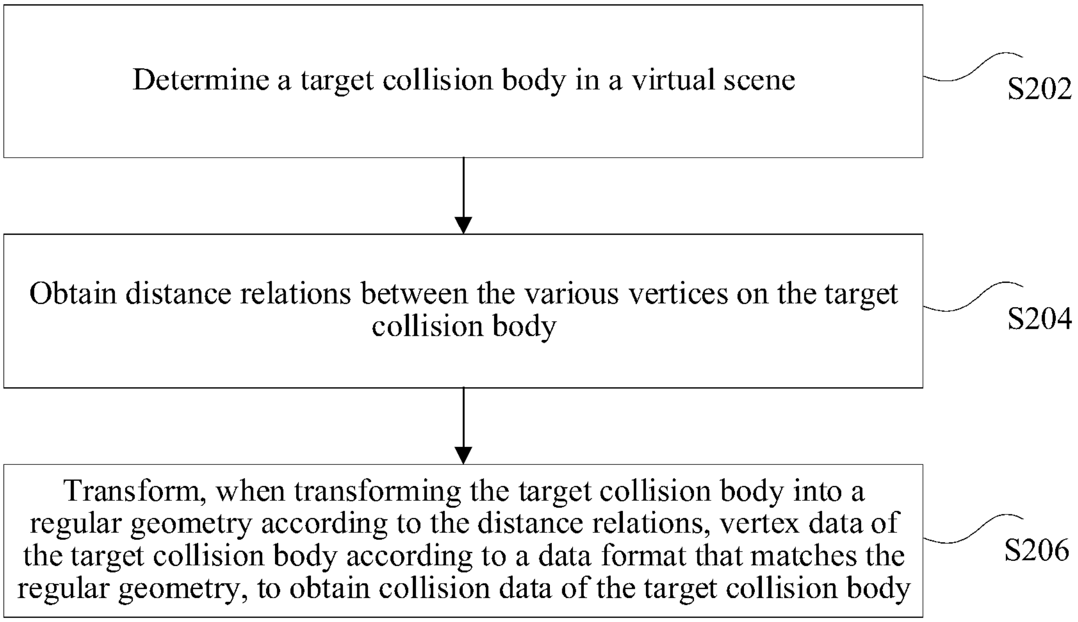
FIG. 2 is a flow diagram of a collision data processing method according to an embodiment of this application.

In one implementation, as shown in FIG. 2, the above collision data processing method may be performed, for example, in an electronic device. The electronic device is, for example, the terminal device or the server as shown in FIG. 1. The method includes:

S202. Determine a target collision body in a virtual scene, the target collision body being a convex polyhedron having vertices.

The target collision body may be, but is not limited to, a collision body configured for a virtual object (for example, a three-dimensional object in the virtual scene) in the virtual scene. The virtual object here may be, but is not limited to, a dynamic object appearing in the virtual scene, such as a user-controlled virtual character, a virtual prop or carrier, or a pre-configured static object, such as a house building and a plant landscape, or the like. The collision body may be, but is not limited to, a carrier configured for the virtual object and used for detecting a collision occurring in an interaction process. A structure of the target collision body in this embodiment is complex, which is a structure designed for fitness on the basis of a structural framework of the virtual object itself (such as a skeleton framework of a virtual character and a reinforced structural framework of a house building), that is, the convex polyhedron containing the plurality of vertices.

S204. Obtain distance relations between the respective vertices on the target collision body. The distance relation is used for characterizing a shape feature of the target collision body.

In the related technology, the electronic device has relatively high consumption for the collision operation. Usually, due to a relatively complex geometric structure of the collision body, a large amount of vertex data needs to be introduced, resulting in relatively high data calculation consumption during collision operation and artistic creation. In order to overcome the above problems, this embodiment provides a method for simplifying the structure of the target collision body on the basis of the distance relations between the respective vertices on the target collision body, transforming the target collision body to a regular geometry object with a simplified structure, and storing collision data in the regular geometry object, so as to improve the operation efficiency of the electronic device for processing collision data of a collision body (for example, to improve the operation efficiency of determining whether the collision body collides).

In one embodiment, distance relations between various vertices are used for characterizing comparison results of distances between the various vertices. The distance relation may reflect the shape feature of the target collision body. The various vertices on the target collision body are traversed, each of which is used as a current vertex. A plurality of distances between all the other vertices (namely, vertices other than the current vertex) and the current vertex are obtained separately. The above distance relations may be relations of the plurality of distances. The distance relation may be used for recognizing the target collision body as the regular geometry object with a similar structure to the target collision body. The regular geometry object may include, but is not limited to: a rectangular solid and a cylinder. Vertex data of the target collision body will be transformed according to a data format of a regular geometry object similar to the target collision body, namely, a format of the vertex data is transformed into the data format of the regular geometry object similar to the target collision body, so as to achieve an objective of simplifying collision data of a collision body.

S206. Transform, when transforming the target collision body into a regular geometry object according to the distance relations, vertex data of the target collision body according to a data format that matches the regular geometry object, the regular geometry object being configured to obtain collision data of the target collision body when the target collision body collides with another virtual object in the virtual scene. The data format of the collision data matches the data format of the regular geometry object. The collision data of the target collision body is used for characterizing a target collision body with a simplified structure.

In one embodiment, the data format that matches the regular geometry object may be, but is not limited to, a format corresponding to index parameters of the regular geometry object. For example, when the regular geometry object is a rectangular solid, the index parameters of the regular geometry object may include, but are not limited to, a center point coordinate and a convergence direction of an oriented bounding box. When the regular geometry object is a cylinder, the index parameters of the regular geometry object may include, but are not limited to, a center point coordinate and a radius. This is by way of an example and is not intended to be limited in this embodiment.

In addition, in one embodiment, the rectangular solid in the regular geometry object may include, but is not limited to: a standard rectangular solid and a reference rectangular solid. The reference rectangular solid may be, but is not limited to, a structure similar to that of the standard rectangular solid, namely, an approximate rectangular solid.

In one embodiment, after the regular geometry object is determined as a reference rectangular solid, a convex feature of the reference rectangular solid may also be, but not limited to, extracted (for example, feature extraction is performed on a convex side of the reference rectangular solid) to further recognize a structure to which the reference rectangular solid specifically corresponds in the virtual scene. As in the reference rectangular solid, a relation between three axial edge lengths representing a length, a width and a height is as follows: If two of the axial edge lengths are less and are much less than the third axial edge length, the target collision body is recognized as a wood stick. If one axial edge length is less and is much less than the other two axial edge lengths, the target collision body can be recognized as a roof. The three axial edge lengths are three values of the length, the width and the height in the reference rectangular solid. This is by way of an example and is not intended to be limited in this embodiment.

In one embodiment, the above collision data processing method can be applied to, but is not limited to, a data optimization process of a collision body corresponding to a single virtual object model, or can perform simplification optimization processing on data of collision bodies corresponding to all virtual object models in a virtual scene in batches, thereby improving the processing efficiency of the electronic device on collision data.

Further, in one embodiment, different accuracies, but are not limited to, may also be selected to process the collision data, depending on different specific uses. For example, when the collision data processing method is applied to a client, there is a relatively high requirement for the accuracy of collision data processing. When the collision data processing method is applied to a server, there is a relatively low requirement for the accuracy of collision data processing. The accuracy here may be, but is not limited to, a data accuracy during the transformation of the collision data. An art designer will not need to deeply learn about a simplification optimization algorithm and its parameters by processing the collision data at different accuracies, so that processing operations with various accuracies can be conveniently provided, which achieves objectives of simplifying the processing operation and improving the processing efficiency of the electronic device.

By embodiments provided by this application, after the target collision body in the virtual scene is determined, the distance relations of the various vertex on the target collision body are obtained. Whether the target collision body can be transformed into the regular geometry object with a simplified structure is then determined according to the distance relations. When it is determined to transform the target collision body into the regular geometry object, the vertex data of the above target collision body is transformed according to the data format that matches the regular geometry object, to obtain the simplified collision data of the target collision body. Thus, the target collision body with the complicated structure can be transformed into the regular geometry object with the simplified structure, and the collision data of the collision body is stored in the data format that matches the regular geometry object. The collision operation is performed using the simplified collision data, so as to reduce calculation consumption on collision data and achieve an effect of improving the processing efficiency on collision data, thereby overcoming the problem of low processing efficiency of the electronic device on collision data in the related technology.

As an exemplary scheme, obtaining distance relations between the respective vertices on a target collision body includes:

- separately obtaining, when a quantity of the vertices on the target collision body reaches a first threshold, the distance relations between a plurality of edges respectively connected to each vertex on the target collision body. That is, comparison results of lengths of the plurality of edges are determined.

On this basis, the collision data processing method may further include: transforming, when the distance relations indicate that three edges connected to one target vertex in the target collision body are perpendicular to one another, the target collision body into a standard rectangular solid, the regular geometry object including the standard rectangular solid. A target vertex is a vertex where three edges connected thereto are perpendicular to one another.

In one embodiment, the first threshold may be, but is not limited to, a quantity of vertices of a standard rectangular solid, and the first threshold may be, but is not limited to, eight. That is, when the quantity of the vertices on the target collision body reaches eight, distances between the various vertices are obtained, and whether the target collision body is a standard rectangular solid is recognized on the basis of the relations between the various distances.

In one embodiment, before the transforming vertex data of the target collision body according to a data format that matches the regular geometry object, the method further includes:

- determining a current vertex from the various vertices on the target collision body, and determining a first reference point and a second reference point which are closest to the current vertex;
- obtaining a first distance between the current vertex and the first reference point and a second distance between the current vertex and the second reference point;
- determining a third distance according to the first distance and the second distance, the third distance being a length of a hypotenuse of a right triangle, and the right triangle taking the first distance and the second distance as lengths of the right-angled edges;
- determining a third reference point from various vertices other than the current vertex, the first reference vertex and the second reference point on the target collision body according to the third distance, a distance between the current vertex and the third reference point being the third distance;
- determining a reference plane of the target collision body according to the first reference point, the second reference point, and the third reference point;
- determining a fourth reference point closest to the current vertex from various vertices other than the current vertex, the first reference vertex, the second reference point and the third reference point on the target collision body, a connecting line between the fourth reference point and the current vertex is perpendicular to the reference plane; and
- determining the current vertex as the target vertex, and determining, according to the first distance, the second distance, and a fourth distance between the current vertex and the fourth reference point, a convergence direction of an oriented bounding box that matches the standard rectangular solid, the vertex data including a direction vector of the convergence direction of the oriented bounding box.

Figure 3:
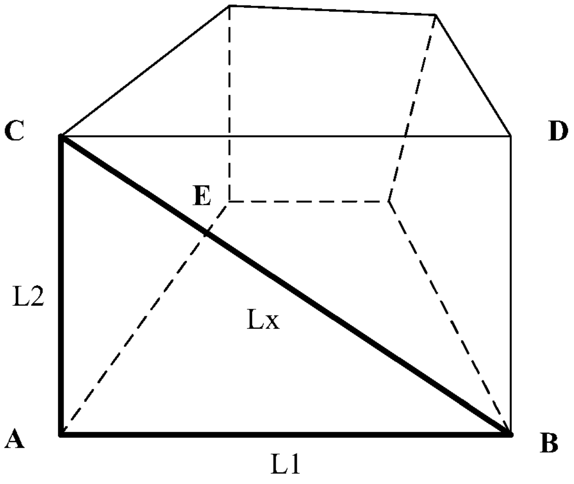
FIG. 3 is a schematic diagram of an exemplary collision data processing method according to an embodiment of this application.

A specific description will be made with reference to the target collision body shown in FIG. 3:

When it is determined that the quantity of the vertices of the target collision body reaches eight, traversal calculation starts at any point. It is assumed that the calculation starts at vertex A serving as the current vertex as shown in FIG. 3: Two vertices B (namely, a first reference point) and C (a second reference point) closest to vertex A are found. A distance between A and B corresponds to L1 (a bold horizontal line as shown in FIG. 3, namely, a first distance), and a distance between A and C corresponds to L2 (a bold vertical line as shown in FIG. 3, namely, a second distance). It can be determined, according to the rule of a rectangle, that vertex A, vertex B and vertex C are adjacent vertices, and AB is perpendicular to AC.

A distance of the hypotenuse BC of triangle ABC is calculated to be Lx according to respective positions of vertex B and vertex C and the respective distances L1 and L2. The remaining vertices on the target collision body are traversed to obtain distances between each vertex and vertex A in sequence. Vertex D (namely, a third reference point) that is also spaced apart from vertex A at a distance of Lx (namely, the third distance) is determined as the last point of a plane (namely, a reference plane) where triangle ABC is located.

Distances from the remaining vertices other than vertices B, C and D to vertex A, to find vertex E that is closest to vertex A, so that it is determined from a geometric relation of a rectangular solid that AB, AC and AE are respectively three mutually perpendicular edges in the rectangular solid. Vectors respectively corresponding to the three edges can be determined as a forward vector, a right vector and an up vector of the standard rectangular solid. The lengths of the three edges are traversed and compared. The longest edge AE (a distance of which is the fourth distance) is recognized as the forward vector of the rectangular solid and is determined as an accurate convergence direction of an oriented bounding box (OBB) of the currently recognized standard rectangular solid.

According to the embodiments of this application, when the quantity of the vertices on the target collision body reaches the first threshold and the three edges connected to the target vertex are perpendicular to one another, the target collision body is recognized as the standard rectangular solid. The convergence direction of the OBB of the standard rectangular solid is then determined on the basis of the distance relations between the target vertex and other vertices. The vertex data of the above target collision body is transformed according to a data format corresponding to the standard rectangular solid, to obtain the collision data that transforms the target collision body into the simplified standard rectangular solid, thereby achieving effects of simplifying the collision data and improving the processing efficiency of the electronic device that uses collision data for collision operation.

As an exemplary scheme, obtaining distance relations between the respective vertices on a target collision body includes:

S1. Determine a center coordinate point of all the vertices on the target collision body when a quantity of the vertices on the target collision body reaches a first threshold. The center coordinate point is a mean value of coordinate values of all the vertices.

S2. Obtain the distance relations between the respective vertices and the center coordinate point. The distance relation corresponding to any vertex is used for characterizing a distance between the vertex and the center coordinate point.

In one embodiment, based on determining the distance relations, the collision data processing method may further include:

1) determining, when the distance relations indicate that respective distances between the various vertices and the center coordinate point are less than a first distance threshold, that the target collision body is recognized as a reference rectangular solid, the regular geometry object including the reference rectangular solid; and
2) determining, when determining at least two groups of parallel surfaces according to the distance relations of the various vertices, that the target collision body is recognized as a reference rectangular solid, the regular geometry object including the reference rectangular solid. Each group of parallel surfaces includes two mutually parallel surfaces. For example, the two mutually parallel surfaces each include four vertices.

Collision bodies appearing in the virtual scene may not all be standard rectangular solids, but mostly of them are approximate rectangular solids (namely, reference rectangular solids, which may also be referred to as standard rough rectangular solids). Thus, in this embodiment, it is also possible to determine whether the target impacting body is a standard rough rectangular solid by at least one of the following ways: 1) If the distances between all the vertices on the collision body and the center coordinate point are approximately equal (namely, the respective distances between the various vertices and the center coordinate point are all less than a first distance threshold), it can be determined that the collision body is recognized as a standard rough rectangular solid. 2) If at least two groups of planes approximately parallel to each other exist in the eight vertices of the collision body (namely, at least two groups of parallel surfaces are determined on the basis of the various vertices), it can be determined that the collision body is recognized as a standard rough rectangular solid.

In one embodiment, after the determining that the target collision body is recognized as a reference rectangular solid, the collision data processing method further includes: obtaining a first volume value corresponding to the target collision body, and a second volume value corresponding to the reference rectangular solid; determining a ratio of the first volume value to the second volume value; and determining, when the ratio reaches a second threshold, that the target collision body is transformed into the reference rectangular solid.

The second threshold here may be, but is not limited to, different, which is set for different specific use scenes. For example, when the collision data processing method is applied to a client, there is a relatively high requirement for the accuracy of collision data processing, and the threshold here may be set to be a relatively large value. When the collision data processing method is applied to a server, there is a relatively low requirement for the accuracy of collision data processing, and the threshold here may be set to be a relatively small value. The second threshold is less than or equal to 1.

For example, assuming that the second threshold is 1, when the ratio of the first volume value V1 corresponding to the target collision body to the second volume value V2 corresponding to the reference rectangular solid is p, the ratio p is compared with the second threshold 1. In a case of p=1, it is determined that the target collision body recognized as the reference rectangular solid can be transformed into the reference rectangular solid. However, when the ratio is less than the second threshold of 1, it indicates that there is a large difference therebetween, and the target collision body recognized as the reference rectangular solid does not need to be transformed into the reference rectangular solid, so that the vertex data of the target collision body does not need to be transformed into collision data matching the data format of the reference rectangular solid.

By this embodiment of this application, when it is determined that the distances between the various vertices and the center coordinate point are all less than the first distance threshold, or at least two groups of parallel surfaces exist in the various vertices, the target collision body is recognized as the reference rectangular solid (approximate rectangular solid). In this case, the reliability of the above approximate recognition result is verified by using a volume comparison result between the target collision body and the reference rectangular solid. When the volume comparison result indicates that a threshold condition has been satisfied, it is determined to transform the vertex data of the target collision body into the simplified collision data in the format corresponding to the reference rectangular solid, so as to achieve the effect of improving the processing efficiency of the electronic device that uses collision data for collision operation.

As an exemplary scheme, after the determining that the target collision body is transformed into the reference rectangular solid, the collision data processing method further includes:

S1. Determine a projection plane corresponding to the reference rectangular solid.

S2. Map the various vertices on the reference rectangular solid to the projection plane, to obtain projection points respectively corresponding to the various vertices.

S3. Group the various vertices according to projection distances between the vertices and the corresponding projection points to obtain a first plane vertex set and a second plane vertex set, the vertices in the first plane vertex set being located on a first plane, and the vertices in the second plane vertex set being located on a second plane.

S4. Determine, according to the first plane and the second plane when the first plane is parallel to the second plane, a convergence direction of an oriented bounding box that matches the reference rectangular solid, the vertex data including a direction vector of the convergence direction of the oriented bounding box.

After the target collision body is recognized as the reference rectangular solid, the target collision body also needs to be transformed into a collision box, and the convergence direction of the OBB corresponding to the bounding box is recognized. As an exemplary embodiment, the convergence direction of the OBB of the reference rectangular solid may be determined, but is not limited to, using a projection plane-separated axial OBB convergence algorithm.

Figure 4:
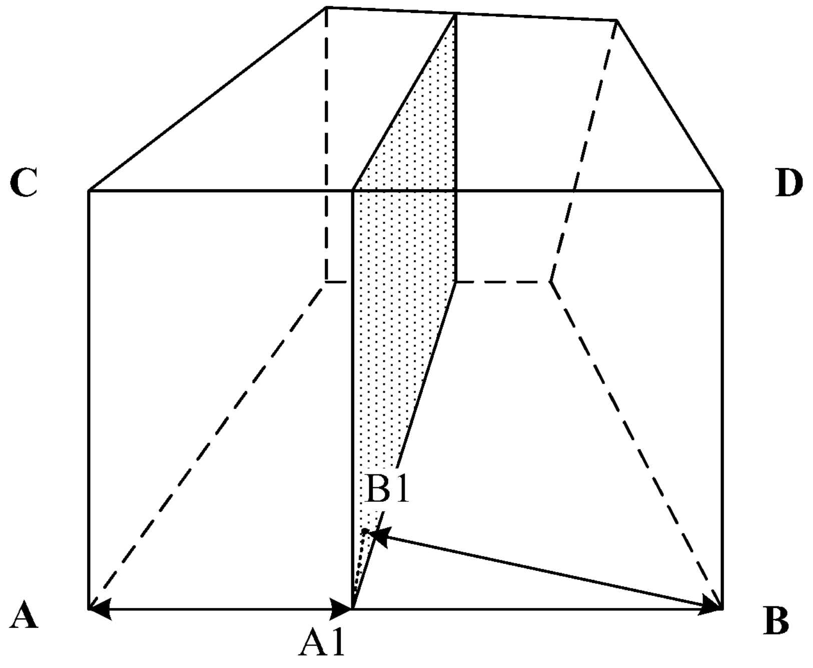
FIG. 4 is a schematic diagram of another exemplary collision data processing method according to an embodiment of this application.

A specific description will be made with reference to the target collision body shown in FIG. 4:

It is assumed that the target collision body has been recognized as the reference rectangular solid as shown in FIG. 4, and the projection plane corresponding to the reference rectangular solid is determined to be a plane formed by a dot filling region shown in FIG. 4, a vertical plane perpendicular to a horizontal plane.

All the vertices on the reference rectangular solid are then traversed. Vertex A is continued to be used for description. Projection point A1 of vertex A on the projection plane is calculated, and then projection points respectively corresponding to other vertices on the projection plane are found. It is further assumed that projection point B1 of vertex B on the projection plane is closest to projection point A1 (a distance between the dotted lines A1B1 as shown in the figure). Respective projection distances of AA1 and BB1 are then compared, and vertex A and vertex B are classified as a far plane point and a near plane point according to a comparison result of the distances.

After the traversing process for all the vertices on the reference rectangular solid is completed, four far plane vertices and four near plane vertices will determined from the eight vertices of the reference rectangular solid, namely, a first plane vertex set and a second plane vertex set. If the vertices in the first plane vertex set are located on the first plane and the vertices in the second plane vertex set are located on the second plane, and the first plane and the second plane are two approximately parallel planes, it can be further determined that the reference rectangular solid is an approximately rectangular solid. Three axial directions, namely forward, right and up, of the determined reference rectangular solid are then recognized in the above manner based on the manner described herein.

After the three axial directions are determined, all the vertices on the reference rectangular solid are traversed for calculation again and are projected to the three axial directions separately, to obtain a maximum value and a minimum value. A mean value in each axial direction is then calculated according to the maximum value and the minimum value here, namely, half of an edge length value of ExtendX in the X axial direction, a half of an edge length value of ExtendY in the Y axial direction, and half of an edge length value of ExtendZ in the Z axial direction. The accurate convergence direction of the OBB is then obtained by convergence.

Figure 5:
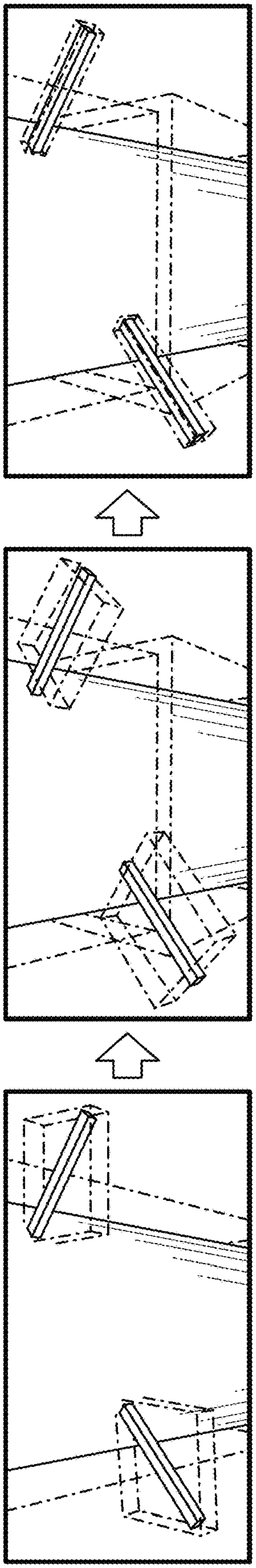
FIG. 5 is a schematic diagram of yet another exemplary collision data processing method according to an embodiment of this application.

When the OBB convergence algorithm is not used, a display effect of the collision body will be as shown in the left picture of FIG. 5, which shows serious mismatch. After an orientation of the OBB is roughly calculated, a display effect will be as shown in the middle picture of FIG. 5, which still does not match enough although the orientation is correct. However, after the complete OBB convergence algorithm is used, the display effect will be as shown in the right picture of FIG. 5, which can accurately match an original model.

By the embodiments of this application, the projection plane-separated axial OBB convergence algorithm is used to determine a more accurate convergence direction for the reference rectangular solid, to facilitate transforming the target collision data into the collision data that is easy to store and process.

As an exemplary scheme, after the determining that the target collision body is transformed into the reference rectangular solid, the collision data processing method further includes:

S1. Determine a forward vector corresponding to a geometric center point of the reference rectangular solid, and determine a vertical plane containing the forward vector.

S2. Rotate the vertical plane for multiple times (for example, for N times, N is a positive integer) by taking a direction of the forward vector as an axis, and perform following operations after each rotation:

grouping the various vertices on the reference rectangular solid according to vertical distances from the various vertices to the vertical plane to obtain a third plane vertex set and a fourth plane vertex set, the vertices in the third plane vertex set being located on a third plane, and the vertices in the fourth plane vertex set being located on a fourth plane.

S3. Determine, according to the third plane and the fourth plane when the third plane is parallel to the fourth plane, a convergence direction of an oriented bounding box that matches the reference rectangular solid, the vertex data including a direction vector of the convergence direction of the oriented bounding box.

After the target collision body is recognized as the reference rectangular solid, the target collision body also needs to be transformed into a collision box, and the convergence direction of the OBB corresponding to the bounding box is recognized. As an exemplary embodiment, the convergence direction of the OBB of the reference rectangular solid may be determined, but is not limited to, using a rotation recursion OBB convergence algorithm.

Details are described in combination with the following examples. Horizontal rotation recursion is taken as an example.

A forward vector is generated on the basis of the geometric center point of the reference rectangular solid, and the recursive operation is performed by rotation around the axis Forward by 0 to 360 degrees on the basis of the vertical plane in the forward direction.

Each recursive rotation includes: controlling the vertical plane to rotate about the axis by 1 degree, and vertical distances from all the vertices on the reference rectangular solid to the above vertical plane in this angular state are calculated; classifying vertices with approximately equal vertical distances are classified into one group, to obtain a plurality of groups of vertex sets with approximately equal distances;

finding, after a recursive rotation operation result is obtained by completing the 360-degree rotation process, a maximum quantity of vertex sets with approximately equal distances away from the vertical plane, and determining same as candidate plane vertex sets; and determining whether a plane determined on the basis of the candidate plane vertex sets is parallel to the above reference vertical plane. In a case of determining that the plane is parallel to the vertical plane, it is further determined that the reference rectangular solid is an approximate rectangular solid. Three axial directions, namely forward, right and up, of the determined reference rectangular solid are then recognized in the above manner based on the manner described herein.

After the three axial directions are determined, all the vertices on the reference rectangular solid are traversed for calculation again and are projected to the three axial directions separately, to obtain a maximum value and a minimum value. A mean value in each axial direction is then calculated according to the maximum value and the minimum value here, namely, half of an edge length value of ExtendX in the X axial direction, a half of an edge length value of ExtendY in the Y axial direction, and half of an edge length value of ExtendZ in the Z axial direction. The accurate convergence direction of the OBB is then obtained by convergence.

By the embodiments of this application, the rotation recursion OBB convergence algorithm is used to determine a more accurate convergence direction for the reference rectangular solid, to facilitate transforming the target collision data into the collision data that is easy to store and process.

As an exemplary scheme, after the determining a ratio of the first volume value to the second volume value, the collision data processing method further includes:

extracting, when the ratio does not reach the second threshold, a convex feature of the reference rectangular solid, the convex surface feature including edge lengths of three axial edges corresponding to the reference rectangular solid, and the three axial edges being mutually perpendicular edges in the reference rectangular solid;

in a case that a first difference value between the edge length of the first axial edge and the edge length of the third axial edge and a second difference value between the edge length of the second axial edge and the edge length of the third axial edge are both greater than a second distance threshold, determining that the reference rectangular solid is transformed into a long stick type rectangular solid; and when a third difference value between the edge length of the first axial edge and the edge length of the second axial edge and a fourth difference value between the edge length of the first axial edge and the edge length of the third axial edge are both greater than a third distance threshold, determining that the reference rectangular solid is transformed into a roof-like rectangular solid.

The transformation method provided in the above method in this embodiment supports transforming most obvious collision body convex hulls into rectangular solids or other regular geometries (such as cylinders or capsules), but there are still some special collision bodies with great differences, which cannot directly complete the accurate and simplified transformation process. These special collision bodies may have, but are not limited to, distinct geometric features.

In one implementation, geometric features referred to for transforming the above special collision bodies may include, but are not limited to, following convex features: distance relations between the three axial edges of the OBB recognized in the reference rectangular solid.

For example, if two of the three axial edges are relatively short and are much shorter than the third axial edge, the reference rectangular solid here will be transformed into a long stick type rectangular solid. If one of the three axial edges is relatively short and is much shorter than the other two axial edges, the reference rectangular solid will be transformed into a roof-like rectangular solid.

By the embodiments of this application, some specific collision bodies are further recognized and transformed on the basis of some recognizable convex features, to perform transformation according to a data format of a determined specific rectangular solid, thereby achieving an effect of simplifying the collision data of the collision body.

As an exemplary scheme, after the obtaining distance relations between the respective vertices and the center coordinate point, the collision data processing method includes:

S1. Obtain a geometric center point of the target collision body when it is determined that the target collision body is a non-reference rectangular solid.

S2. Obtain connecting line distances from the various vertices on the target collision body to the geometry central point.

S3. Recognize the target collision body as a cylinder when difference values between the various connecting line distances are less than a third threshold, the regular geometry object including the cylinder.

S4. Construct a spatial function of the cylinder according to coordinates of the geometric center point and a radius of the cylinder, the vertex data including the spatial function of the cylinder.

If it is determined that the target collision body does not satisfy a recognition condition for a rectangular solid when the quantity of the vertices of the target collision body is not the first threshold, it may be further determined whether the target collision body satisfies a recognition condition for a cylinder.

For example, the geometric center point is determined according to the various vertexes on the target collision body. Distances (namely, the connecting line distances from the various vertices and the geometric center point) from the various vertices to a vertical direction vector of the geometric center point. When the distances from all the vertices to the geometric center point are approximately equal (namely, the difference values between the various connecting line distances are less than the third threshold), the target collision body which is not a reference rectangular solid is recognized as the cylinder.

Then, the spatial function of the cylinder is constructed directly on the basis of a coordinate and a radius of the geometric center point of the recognized cylinder, so as to transform the vertex data of the target collision body with a complicated structure according to a format of the spatial function matching the cylinder.

Upper and lower radiuses of the recognized cylinder are different. If the recognized cylinder is possibly a cylinder with a large upper portion and a small lower portion, alignment is required, so as to perform cutting division. If the complex convex is split and merged into a plurality of simple bounding boxes, the cutting division manner of the cylinder may be similar to, but is not limited to, a cutting division manner of a convex decomposition algorithm.

By the embodiments of this application, it is determined whether the target collision body can be recognized as a cylinder when the target collision body is not a reference rectangular solid. When the target collision body is recognized as a cylinder, data of the target collision body matching the cylinder is determined, so as to facilitate simplification transformation, thereby achieving an objective of reducing the operation complexity of storage of the collision data of the target collision body, and improving the processing efficiency of the electronic device for invoking the stored collision data to perform the collision operation.

As an exemplary scheme, before the transforming vertex data of the target collision body according to a data format that matches the regular geometry object, the collision data processing method further includes:

S1. Split the target collision body by using equidistant bounding boxes, to obtain a plurality of collision sub-bodies.

S2. Determine intersection points of connecting lines between the various vertices on the target collision body and the various collision sub-bodies in the plurality of collision sub-bodies.

S3. Perform converge combination on the intersection points in each collision sub-body in sequence to obtain a bounding sub-box corresponding to the collision sub-body.

S4. Traverse the various bounding sub-boxes, and merge bounding sub-boxes with size difference values less than a fourth threshold, to obtain a bulk bounding box corresponding to the target collision body.

S5. Take vertex data of the bulk bounding box as the vertex data of the target collision body.

In this embodiment, for a convex with a complex structure, a convex decomposition algorithm can be used, but is not limited to, to split the complex target collision body and merge same into a plurality of simple bounding boxes.

Figure 6:
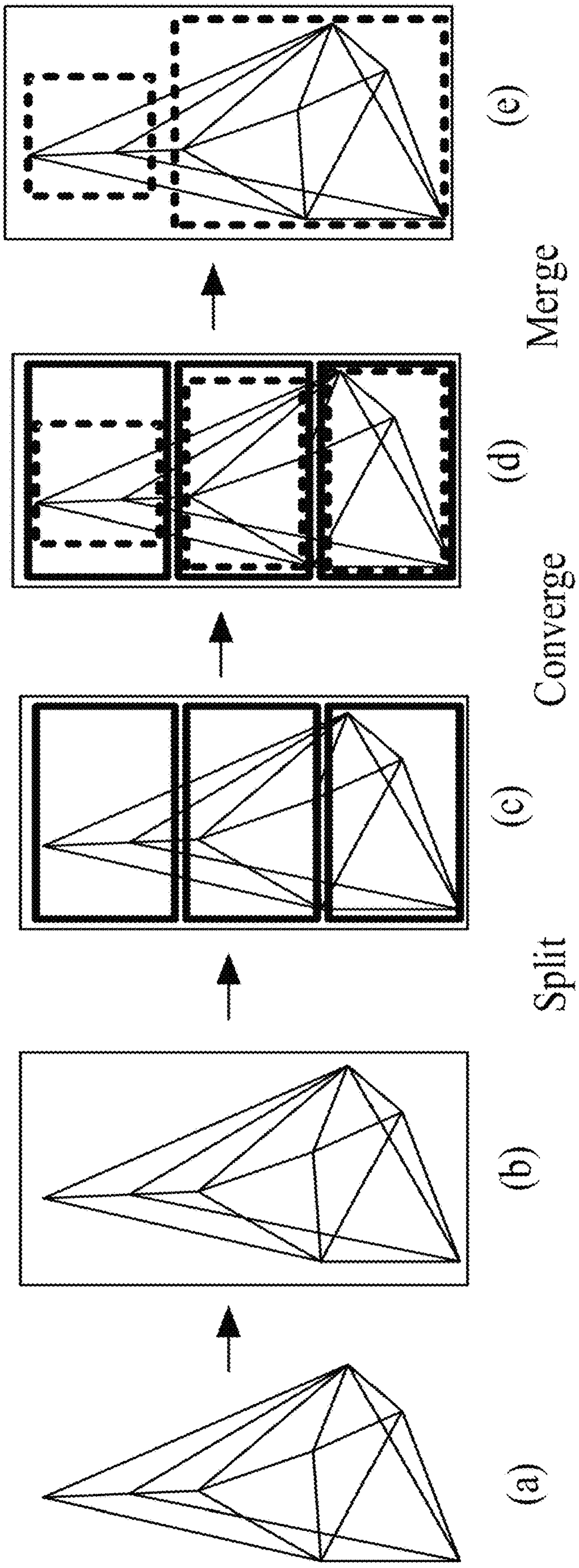
FIG. 6 is a schematic diagram of still another exemplary collision data processing method according to an embodiment of this application.

A specific description will be made with reference to the flow of the convex decomposition algorithm shown in FIG. 6:

It is assumed that the target collision body (hereinafter referred to as convex) is a cone as shown in FIG. 6(*a*). As shown in FIG. 6(*b*), the convex is selected for splitting. When the convex is split into a plurality of collision sub-bodies by using equidistant bounding boxes constructed in a unit distance according to a size of the convex, three equal-sized rectangular solid as shown in FIG. 6(*c*) may be obtained as a splitting result.

Figure 7:
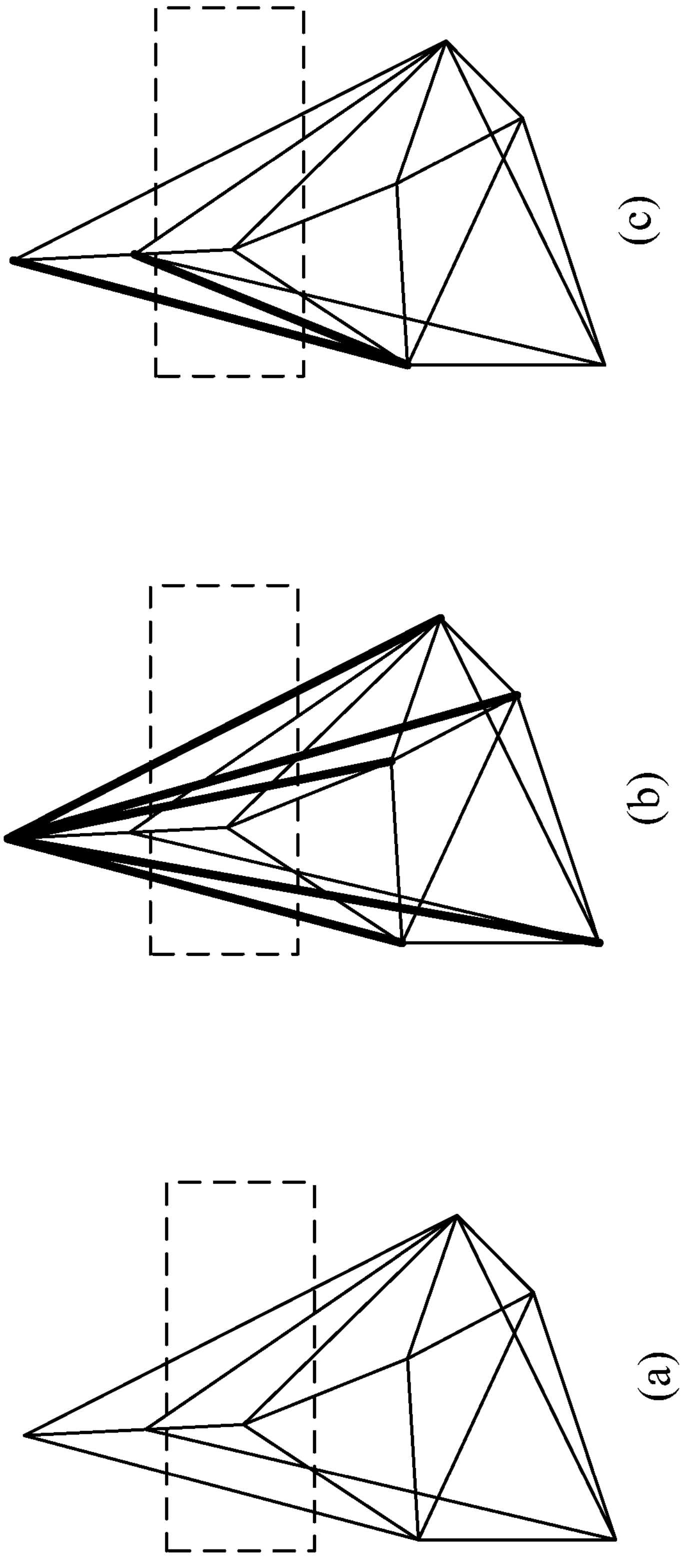
FIG. 7 is a schematic diagram of still yet another exemplary collision data processing method according to an embodiment of this application.

Next, intersection points of connecting lines between the various vertices on the target collision body and the various collision sub-bodies are determined. For example, the convex shown in FIG. 7(*a*) is the convex shown in FIG. 6(*a*). As shown in FIG. 7(*b*), an upper intersection process is performed upward on the basis of lower vertices and a lower intersection process is performed downward on the basis of upper vertices. Intersection here means determining intersection points.

The intersection points in each collision sub-body are converged and combined in sequence, so as to obtain a bounding box occupying a small space, namely, a bounding box composed of all the intersection points. The bounding boxes shown by the dashed boxes in FIG. 6(*d*) are bounding sub-boxes (represented by bold solid lines in the figure) obtained by converging the bounding boxes after equidistant splitting in of FIG. 6(*c*). Sizes of the above bounding sub-boxes are then judged. Bounding boxes with similar sizes that are less than a threshold (namely, the difference value in size is less than the fourth threshold) are merged into one larger bounding box (namely, a bulk bounding box). As shown in FIG. 6(*e*), the two bounding sub-boxes are merged into one larger bounding box.

By the embodiments of this application, since the target collision body is divided on the basis of the equidistant bounding boxes, the target collision body is simplified into the collision sub-bodies which occupies a smaller space, and the collision sub-bodies are then combined and merged, which achieves an objective of simplifying the structure of the target collision body and obtaining the simplified collision data.

As an exemplary scheme, after the transforming the target collision body to a regular geometry object according to the distance relations, the collision data processing method further includes:

S1. Determine, when the regular geometry object includes a plurality of regular sub-geometries, sizes of the regular sub-geometries.

S2. Merge two adjacent regular sub-geometries when a difference value between the sizes of the two adjacent regular sub-geometries is less than a fifth threshold.

S3. When a difference value between a size of a first regular sub-geometry and a size of a second regular sub-geometry in the plurality of rule sub-geometries is less than a sixth threshold, and the first regular sub-geometry is located inside the second regular sub-geometry, cull the first regular sub-geometry.

When the regular geometry object includes a plurality of regular sub-geometries, further processing may be performed using, but is not limited to, a combinational merging algorithm and a small object culling algorithm. The combinational merging algorithm is to merge two connected rectangular solids with similar sizes or having an inclusion relation into one rectangular solid (namely, the difference value between the sizes of two adjacent regular sub-geometries is less than the fifth threshold). The above small object culling algorithm is to directly cull a certain bounding box that is far smaller than surrounding bounding boxes (namely, the difference value between the size of the first regular sub-geometry and the second regular sub-geometry is less than the sixth threshold) and is embedded in other bounding boxes.

In addition, in this embodiment, error checking may be performed after the transformation is completed, but is not limited to. The various vertices of the rectangular solid after transformation are compared with the various vertices of the original target collision body. It is indicated that the transformation succeeds when an error is less than an error range, or the transformation is not allowed.

By the embodiments of this application, unified simplification will be performed on a complex regular geometry object containing a plurality of regular sub-geometries by the combinational merging method and a small object replacement method to facilitate obtaining the simplified collision data.

As an exemplary scheme, the transforming the vertex data of the target collision body according to a data format matching the regular geometry object to obtain collision data of the target collision body includes: transforming the vertex data of the target collision body according to a data format of a geometric index that matches the regular geometry object, to obtain the collision data.

In some embodiments, in this embodiment, when the target collision body is transformed into the rectangular solid, the transformation and storage are performed according to the data format of geometric indexes matching the rectangular solid. For example, the coordinate of the center coordinate point and the direction vector of the convergence direction of the OBB are stored. When the target collision body is transformed into the cylinder, the transformation and storage are performed according to the data format of geometric indexes matching the cylinder. For example, the geometric center point, the radius and the like of the cylinder are stored.

By the embodiments of this application, the vertex data of the target collision body is stored according to the data format of the geometric indexes matching the regular geometry object, which simplifies the storage manner of the collision data of the target collision body with a complex structure, thereby improving the processing efficiency for invoking the collision data to perform a collision operation.

Figure 8:
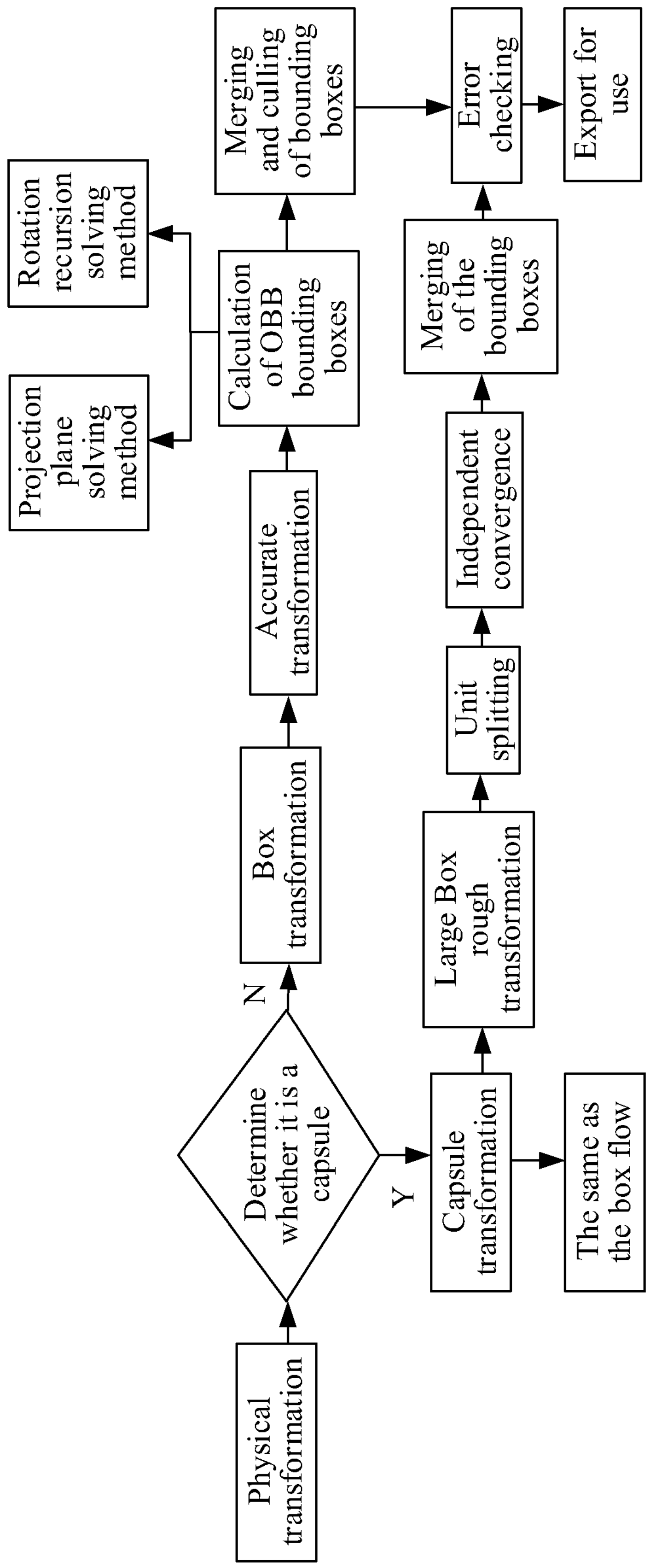
FIG. 8 is a flow diagram of another exemplary collision data processing method according to an embodiment of this application.

Specifically, a description is provided with reference to the example shown in FIG. 8.

After a target collision body is obtained, it is physically simplified. Whether the target collision body is a capsule (namely, a cylinder) is first determined. If the target collision body is a capsule, the target collision body is directly transformed into a capsule that is easy to process, and vertex data of the target collision body is transformed and stored according to a data format corresponding to the capsule. The transformation process can refer to the flow of the reference rectangular solid (such as Box), same as below.

When it is determined that the target collision body is not a capsule, but a standard rectangular solid, the Box transformation flow is used, to accurately transform the target collision body into the standard rectangular solid, and a convergence direction of a corresponding OBB is calculated. The vertex data of the target collision body is transformed according to a data format of the standard rectangular solid, to obtain collision data when the target collision body collides with another virtual object in the virtual scene. Manners of calculating the convergence direction of the OBB includes a projection plane solving method and a rotation recursion solving method. The standard rectangular solid after transformation is subjected to combinatorial merging or culling of small objects and error checking. After the verification succeeds, the transformed collision data is exported for use.

When it is determined that the target collision body is not a capsule, but a standard rough rectangular solid, the large Box rough transformation flow is adopted, in which, the target collision body is decomposed by unit splitting and independent convergence, and then the decomposed bounding boxes are then merged. The vertex data of the target collision body is transformed according to a data format of the standard rough rectangular solid, to obtain collision data when the target collision body collides with another virtual object in the virtual scene. The error checking is performed on the collision data. After the verification succeeds, the transformed collision data is exported for use.

Figure 10:
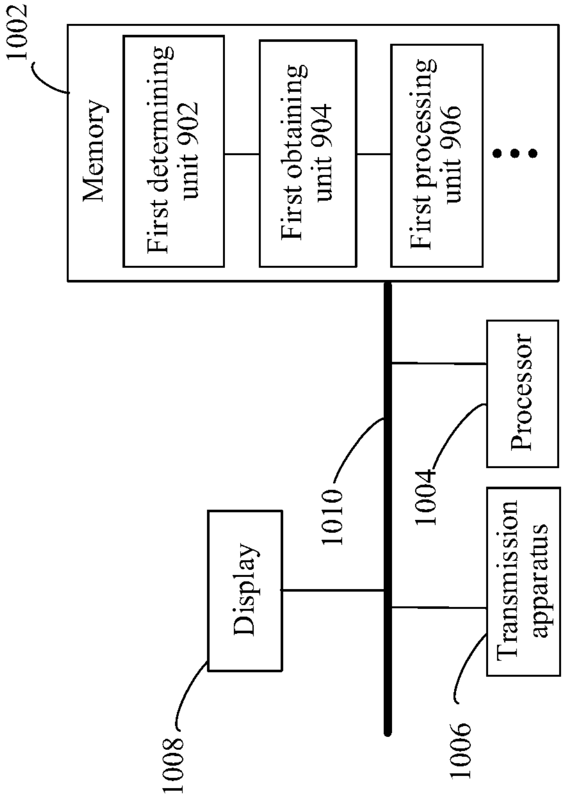
FIG. 10 is a schematic structural diagram of an exemplary electronic device according to an embodiment of this application.

The flow shown in FIG. 10 described above is an example and is not limited in this embodiment.

For brief description, the foregoing method embodiments are represented as a series of action combinations. However, persons skilled in the art should appreciate that this application is not limited to the described order of the actions, because according to this application, some steps may be performed in other orders or simultaneously. It should be further appreciated by persons skilled in the art that the embodiments described in this specification all belong to preferred embodiments, and the involved actions and modules are not necessarily required by this application.

Figure 9:
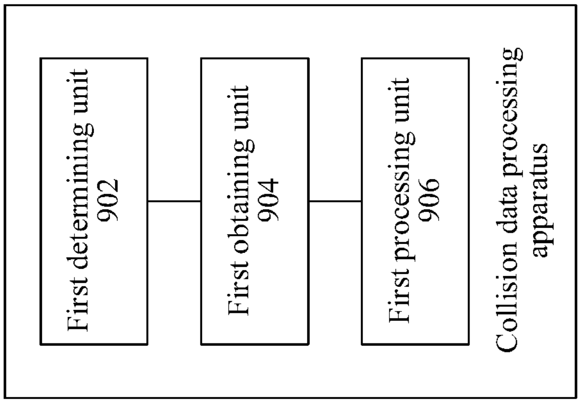
FIG. 9 is a schematic structural diagram of an exemplary collision data processing apparatus according to an embodiment of this application.

According to another aspect of the embodiments of this application, a collision data processing apparatus for implementing the collision data processing method described above is further provided. As shown in FIG. 9, the apparatus includes:

a first determining unit 902, configured to determine a target collision body in a virtual scene, the target collision body being a convex polyhedron having vertices;

a first obtaining unit 904, configured to obtain distance relations between the respective vertices on the target collision body, the distance relations characterizing a shape feature of the target collision body; and a first processing unit 906, configured to transform, when transforming the target collision body into a regular geometry object according to the distance relations, vertex data of the target collision body according to a data format that matches the regular geometry object, the regular geometry object being configured to obtain collision data of the target collision body when the target collision body collides with another virtual object in the virtual scene.

In this embodiment, the embodiment of the above collision data processing apparatus may, but is not limited to, refer to the above method embodiment, and will not be described in detail herein.

As an exemplary scheme, the first obtaining unit includes:

a first obtaining module, configured to separately obtain, when a quantity of the vertices on the target collision body reaches a first threshold, the distance relations between a plurality of edges respectively connected to each vertex on the target collision body; and a first determining module, configured to determine, when the distance relations indicate that three edges connected to one target vertex in the target collision body are perpendicular to one another, that the target collision body is transformed into a standard rectangular solid, the regular geometry object including the standard rectangular solid. A target vertex is a vertex where three edges connected thereto are perpendicular to one another.

In this embodiment, the embodiment of the above collision data processing apparatus may, but is not limited to, refer to the above method embodiment, and will not be described in detail herein.

As an exemplary scheme, the collision data processing apparatus further includes:

a second processing unit, configured to perform the following steps before the transforming vertex data of the target collision body according to a data format that matches the regular geometry object, to obtain collision data of the target collision body:

determining a current vertex from the various vertices on the target collision body, and determining a first reference point and a second reference point which are closest to the current vertex;

obtaining a first distance between the current vertex and the first reference point and a second distance between the current vertex and the second reference point;

determining a third distance according to the first distance and the second distance, the third distance being a length of a hypotenuse of a right triangle, and the right triangle taking the first distance and the second distance as lengths of the right-angled edges;

determining a third reference point from various vertices other than the current vertex, the first reference vertex and the second reference point on the target collision body according to the third distance, a distance between the current vertex and the third reference point being the third distance;

determining a reference plane of the target collision body according to the first reference point, the second reference point, and the third reference point;

determining a fourth reference point closest to the current vertex from various vertices other than the current vertex, the first reference vertex, the second reference point and the third reference point on the target collision body, a connecting line between the fourth reference point and the current vertex is perpendicular to the reference plane; and determining the current vertex as the target vertex, and determining, according to the first distance, the second distance, and a fourth distance between the current vertex and the fourth reference point, a convergence direction of an oriented bounding box that matches the standard rectangular solid, the vertex data including a direction vector of the convergence direction of the oriented bounding box.

In this embodiment, the embodiment of the above collision data processing apparatus may, but is not limited to, refer to the above method embodiment, and will not be described in detail herein.

As an exemplary scheme, the first obtaining unit includes:

a second determining module, configured to determine a center coordinate point of all the vertices on the target collision body when a quantity of the vertices on the target collision body reaches a first threshold;

a second obtaining module, configured to obtain distance relations between the respective vertices and the center coordinate point;

a third determining module, configured to determine, when the distance relations indicate that respective distances between the various vertices and the center coordinate point are less than a first distance threshold, that the target collision body is recognized as a reference rectangular solid, the regular geometry object including the reference rectangular solid; and a fourth determining module, configured to determine, when determining at least two groups of parallel surfaces according to the distance relations of the various vertices, that the target collision body is recognized as a reference rectangular solid, the regular geometry object including the reference rectangular solid.

In this embodiment, the embodiment of the above collision data processing apparatus may, but is not limited to, refer to the above method embodiment, and will not be described in detail herein.

As an exemplary scheme, the collision data processing apparatus further includes:

a third obtaining module, configured to obtain a first volume value corresponding to the target collision body and a second volume value corresponding to the reference rectangular solid after it is determined that the target collision body is the reference rectangular solid;

a fifth determining module, configured to determine a ratio of the first volume value to the second volume value; and a sixth determining module, configured to determine, when the ratio reaches a second threshold, that the target collision body is transformed into the reference rectangular solid.

In this embodiment, the embodiment of the above collision data processing apparatus may, but is not limited to, refer to the above method embodiment, and will not be described in detail herein.

As an exemplary scheme, the collision data processing apparatus further includes:

a first processing module, configured to: determine, after it is determined that the target collision body is transformed into the reference rectangular solid, a projection plane corresponding to the reference rectangular solid;

map the various vertices on the reference rectangular solid to the projection plane, to obtain projection points respectively corresponding to the various vertices;

group the various vertices according to projection distances between the vertices and the corresponding projection points to obtain a first plane vertex set and a second plane vertex set, the vertices in the first plane vertex set being located on a first plane, and the vertices in the second plane vertex set being located on a second plane; and determine, according to the third plane and the fourth plane when the third plane is parallel to the fourth plane, a convergence direction of an oriented bounding box that matches the reference rectangular solid, the vertex data including a direction vector of the convergence direction of the oriented bounding box.

In this embodiment, the embodiment of the above collision data processing apparatus may, but is not limited to, refer to the above method embodiment, and will not be described in detail herein.

As an exemplary scheme, the collision data processing apparatus further includes:

a second processing module, configured to: after it is determined that the target collision body is transformed into a reference rectangular solid, determine a forward vector corresponding to a geometric center point of the reference rectangular solid, and determine a vertical plane containing the forward vector;

rotate the vertical plane for multiple times by taking a direction of the forward vector as an axis, and perform following operations after each rotation:

grouping the various vertices on the reference rectangular solid according to vertical distances from the various vertices to the vertical plane to obtain a third plane vertex set and a fourth plane vertex set, the vertices in the third plane vertex set being located on a third plane, and the vertices in the fourth plane vertex set being located on a fourth plane; and determining, according to the third plane and the fourth plane when the third plane is parallel to the fourth plane, a convergence direction of an oriented bounding box that matches the reference rectangular solid, the vertex data including a direction vector of the convergence direction of the oriented bounding box.

In this embodiment, the embodiment of the above collision data processing apparatus may, but is not limited to, refer to the above method embodiment, and will not be described in detail herein.

As an exemplary scheme, the collision data processing apparatus further includes:

an extraction module, configured to: after the ratio of the first volume value to the second volume value is determined, extract, when the ratio does not reach the second threshold, a convex feature of the reference rectangular solid, the convex surface feature including edge lengths of three axial edges corresponding to the reference rectangular solid, and the three axial edges being mutually perpendicular edges in the reference rectangular solid;

a seventh determining module, configured to: when a first difference value between the edge length of the first axial edge and the edge length of the third axial edge and a second difference value between the edge length of the second axial edge and the edge length of the third axial edge are both greater than a second distance threshold, determine that the reference rectangular solid is transformed into a long stick type rectangular solid; and an eighth determining module, configured to: when a third difference value between the edge length of the first axial edge and the edge length of the second axial edge and a fourth difference value between the edge length of the first axial edge and the edge length of the third axial edge are both greater than a third distance threshold, determine that the reference rectangular solid is transformed into a roof-like rectangular solid.

In this embodiment, the embodiment of the above collision data processing apparatus may, but is not limited to, refer to the above method embodiment, and will not be described in detail herein.

As an exemplary scheme, the collision data processing apparatus further includes:

a third processing module, configured to: after the distance relations between the respective vertices and the center coordinate point are obtained, obtain a geometric center point of the target collision body when it is determined that the target collision body is a non-reference rectangular solid; obtain connecting line distances from the various vertices on the target collision body to the geometry central point; recognize the target collision body as a cylinder when difference values between the various connecting line distances are less than a third threshold, the regular geometry object including the cylinder; and construct a spatial function of the cylinder according to coordinates of the geometric center point and a radius of the cylinder, the vertex data including the spatial function of the cylinder.

In this embodiment, the embodiment of the above collision data processing apparatus may, but is not limited to, refer to the above method embodiment, and will not be described in detail herein.

As an exemplary scheme, the collision data processing apparatus further includes:

a splitting unit, configured to: before the vertex data of the target collision body is transformed according to a data format that matches the regular geometry object, to obtain collision data of the target collision body, split the target collision body by using equidistant bounding boxes, to obtain a plurality of collision sub-bodies;

a second determining unit, configured to determine intersection points of connecting lines between the various vertices on the target collision body and the various collision sub-bodies in the plurality of collision sub-bodies;

a combination unit, configured to perform converge combination on the intersection points in each collision sub-body in sequence to obtain a bounding sub-box corresponding to the collision sub-body;

a first merging unit, configured to traverse the various bounding sub-boxes, and merge bounding sub-boxes with size difference values less than a fourth threshold, to obtain a bulk bounding box corresponding to the target collision body; and a third determining unit, configured to take vertex data of the bulk bounding box as the vertex data of the target collision body.

In this embodiment, the embodiment of the above collision data processing apparatus may, but is not limited to, refer to the above method embodiment, and will not be described in detail herein.

As an exemplary solution, the apparatus further includes:

a fourth determining unit, configured to: after the target collision body is transformed into the regular geometry object according to the distance relations, determine, when the regular geometry object includes a plurality of regular sub-geometries, sizes of the regular sub-geometries;

a second merging unit, configured to: merge two adjacent regular sub-geometries when a difference value between the sizes of the two adjacent regular sub-geometries is less than a fifth threshold; and a culling unit, configured to: when a difference value between a size of a first regular sub-geometry and a size of a second regular sub-geometry in the plurality of rule sub-geometries is less than a sixth threshold, and the first regular sub-geometry is located inside the second regular sub-geometry, cull the first regular sub-geometry.

As an exemplary scheme, the first processing unit includes:

a storage module, configured to: transform the vertex data of the target collision body according to a data format of a geometric index that matches the regular geometry object, to obtain the collision data.

In this embodiment, the embodiment of the above collision data processing apparatus may, but is not limited to, refer to the above method embodiment, and will not be described in detail herein.

According to still another aspect of the embodiments of this application, an electronic device for implementing the above collision data processing method is further provided. The electronic device may be a terminal device or a server shown in FIG. 1. This embodiment is described by taking a server serving as the electronic device for example. As shown in FIG. 10, the electronic device includes a memory 1002 and a processor 1004. The memory 1002 stores a computer program. The processor 1004 is configured to perform the steps in any method embodiments by using the computer program.

In some embodiments, in this embodiment, the electronic device may be located in at least one of a plurality of network devices of a computer network.

In some embodiments, in this embodiment, the processor may be configured to perform the following steps by using a computer program:

S1. Determine a target collision body in a virtual scene, the target collision body being a convex polyhedron having vertices.

S2. Obtain distance relations between the respective vertices on the target collision body.

S3. Transform, when transforming the target collision body into a regular geometry object according to the distance relations, vertex data of the target collision body according to a data format that matches the regular geometry object, the regular geometry object being configured to obtain collision data of the target collision body when the target collision body collides with another virtual object in the virtual scene.

In some embodiments, persons of ordinary skill in the art will appreciate that the structure shown in FIG. 10 is illustrative only and that the electronic device may be a smart phone (for example, an Android cell phone and an iOS cell phone), a tablet, a palmtop, a mobile Internet device (MID), a PAD, and the like. FIG. 10 does not limit the structures of the electronic apparatus and electronic device described above. For example, the electronic apparatus and electronic device may also include more or fewer components (for example, a network interface) than those shown in FIG. 10, or have a different configuration than that shown in FIG. 10.

The memory 1002 may be configured to store software programs and modules, such as program instructions/modules corresponding to the collision data processing method and apparatus in the embodiments of this application. The processor 1004 executes the software programs and modules stored in the memory 1002, so as to perform various functional applications and data processing, namely, to implement the above collision data processing method. The memory 1002 may include high-speed random access memory and may also include a non-volatile memory, such as one or more magnetic storage devices, flash memories, or other non-volatile solid state memories. In some instances, the memory 1002 can further include a memory remotely located with respect to the processor 1004. These remote memories can be coupled to a terminal via a network. Examples of the above network include, but are not limited to, Internets, intranets, local area networks, mobile communication networks, and combinations thereof. The memory 1002 may specifically, but not limited to, store information such as collision data of a target collision body. As an example, as shown in FIG. 10, the memory 1002 may include, but is not limited to, the first determining unit 902, the first obtaining unit 904, and the first processing unit 906 in the collision data processing apparatus. In addition, the memory may also include, but is not limited to, other module or units in the collision data processing apparatus described above, which will not be described in detail in this example.

In some embodiments, a transmission apparatus 1006 is configured to receive or transmit data by using a network. Specific examples of the network include a wired network and a wireless network. In one example, the transmission apparatus 1006 includes a network interface controller (NIC), which can be connected to other network devices and a router via network cables, so as to communicate with the Internet or the local area network. In one example, the transmission apparatus 1006 is a radio frequency (RF) module, configured to communicate with the Internet in a wireless manner.

In addition, the electronic device further includes: a display 1008, configured to display a virtual scene and a virtual object corresponding to a target collision body appearing in the virtual scene; and a connection bus 1010, configured to connect various module components in the above electronic device.

In other embodiments, the terminal device or the server may be a node in a distributed system. The distributed system may be a blockchain system, and the blockchain system may be a distributed system formed by connecting the plurality of nodes via network communication. A peer to peer (P2P) network may be formed between the nodes. A computing device in any form, for example, an electronic device such as a server or a terminal, may become a node in the blockchain system by joining the P2P network.

According to one aspect of this application, a computer program product or a computer program is provided. The computer program product or the computer program includes computer instructions stored in a computer-readable memory. A processor of a computer device reads the computer instructions from the computer-readable storage medium and executes the computer instructions, causing the computer device to implement the above collision data processing method. The computer program is configured to perform the steps in any of the above method embodiments when run.

In some embodiments, in this embodiment, the computer-readable storage medium may be configured to store a computer program for performing the following steps:

S1. Determine a target collision body in a virtual scene, the target collision body being a convex polyhedron having vertices.

S2. Obtain distance relations between the respective vertices on the target collision body, the distance relations characterizing a shape feature of the target collision body.

S3. Transform, when transforming the target collision body into a regular geometry object according to the distance relations, vertex data of the target collision body according to a data format that matches the regular geometry object, the regular geometry object being configured to obtain collision data of the target collision body when the target collision body collides with another virtual object in the virtual scene.

In some embodiments, in this embodiment, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disk, and the like.

The sequence numbers of the foregoing embodiments of this application are merely for description purpose but do not imply the preference among the embodiments.

When the integrated unit in the foregoing embodiment is implemented in the form of a software functional unit and sold or used as an independent product, the integrated unit may be stored in the above computer-readable storage medium. Based on such an understanding, the technical solutions of this application essentially, or a part contributing to the related art, or all or a part of the technical solution may be implemented in a form of a software product. The computer software product is stored in a storage medium and includes several instructions for instructing one or more computer devices (which may be a PC, a server, a network device or the like) to perform all or some of steps of the methods in the embodiments of this application.

In the foregoing embodiments of this application, the descriptions of the embodiments have respective focuses. For a part that is not described in detail in an embodiment, refer to related descriptions in other embodiments.

In the several embodiments provided in this application, it is to be understood that, the disclosed client may be implemented in another manner. The above described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electronic or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in the embodiments of this application may be integrated into one processing unit, or each of the units may be physically separated, or two or more units may be integrated into one unit. The integrated unit may be implemented in a form of hardware, or may be implemented in a form of a software function unit.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely exemplary implementations of this application. A person of ordinary skill in the art may further make several improvements and modifications without departing from the principle of this application, and the improvements and modifications fall within the protection scope of this application.

What is claimed is:

1. A collision data processing method, performed in an electronic device, the method comprising:

determining a target collision body in a virtual scene, the target collision body being a convex polyhedron having vertices and edges;

obtaining distance relations between a plurality of edges respectively connected to each vertex on the target collision body when a quantity of the vertices on the target collision body reaches a first threshold, the distance relations characterizing a shape feature of the target collision body:

determining, when the distance relations indicate that three edges connected to one target vertex in the target collision body are perpendicular to one another, that the target collision body is to be transformed into a standard rectangular solid; and transforming the target collision body into a regular geometry object comprising the standard rectangular solid according to the distance relations and a data format that matches the regular geometry object, wherein the regular geometry object is configured to obtain collision data of the target collision body when the target collision body collides with another virtual object in the virtual scene.

2. The method according to claim 1, wherein the obtaining distance relations between a plurality of edges respectively connected to each vertex on the target collision body when a quantity of the vertices on the target collision body reaches a first threshold comprises:

determining a center coordinate point of the vertices on the target collision body when the quantity of the vertices on the target collision body reaches the first threshold;

obtaining distance relations between the respective vertices and the center coordinate point; and before the transforming vertex data of the target collision body according to a data format that matches the regular geometry object, the method further comprises:

when the distance relations indicate that respective distances between the various vertices and the center coordinate point are less than a first distance threshold, determining that the target collision body is recognized as a reference rectangular solid, the regular geometry object comprising the reference rectangular solid, and the reference rectangular solid being a structure similar to that of a standard rectangular solid; and when determining at least two groups of parallel surfaces according to the distance relations of the various vertices, determining that the target collision body is recognized as a reference rectangular solid.

3. The method according to claim 2, wherein after the determining that the target collision body is recognized as a reference rectangular solid, the method further comprises:

obtaining a first volume value corresponding to the target collision body, and a second volume value corresponding to the reference rectangular solid;

determining a ratio of the first volume value to the second volume value; and when the ratio reaches a second threshold, determining that the target collision body is transformed into the reference rectangular solid.

4. The method according to claim 3, wherein after the determining that the target collision body is transformed into the reference rectangular solid, the method further comprises:

determining a projection plane corresponding to the reference rectangular solid;

mapping the various vertices on the reference rectangular solid to the projection plane, to obtain projection points respectively corresponding to the various vertices;

grouping the various vertices according to projection distances between the vertices and the corresponding projection points to obtain a first plane vertex set and a second plane vertex set, the vertices in the first plane vertex set being located on a first plane, and the vertices in the second plane vertex set being located on a second plane; and determining, according to the first plane and the second plane when the first plane is parallel to the second plane, a convergence direction of an oriented bounding box that matches the reference rectangular solid, the vertex data comprising a direction vector of the convergence direction of the oriented bounding box.

5. The method according to claim 3, further comprising:

after determining that the target collision body is transformed into the reference rectangular solid:

determining a forward vector corresponding to a geometric center point of the reference rectangular solid, and determining a vertical plane containing the forward vector;

rotating the vertical plane for multiple times by taking a direction of the forward vector as an axis, and performing following operations after each rotation:

grouping the vertices on the reference rectangular solid according to vertical distances from the vertices to the vertical plane to obtain a third plane vertex set and a fourth plane vertex set, the vertices in the third plane vertex set being located on a third plane, and the vertices in the fourth plane vertex set being located on a fourth plane; and determining, according to the third plane and the fourth plane when the third plane is parallel to the fourth plane, a convergence direction of an oriented bounding box that matches the reference rectangular solid, the vertex data comprising a direction vector of the convergence direction of the oriented bounding box.

6. The method according to claim 3, further comprising:

after determining a ratio of the first volume value to the second volume value:

extracting, when the ratio does not reach the second threshold, a convex feature of the reference rectangular solid, the convex surface feature comprising edge lengths of three axial edges corresponding to the reference rectangular solid, and the three axial edges being mutually perpendicular edges in the reference rectangular solid;

when a first difference value between the edge length of the first axial edge and the edge length of the third axial edge and a second difference value between the edge length of the second axial edge and the edge length of the third axial edge are both greater than a second distance threshold, determining that the reference rectangular solid is transformed into a long stick type rectangular solid; and when a third difference value between the edge length of the first axial edge and the edge length of the second axial edge and a fourth difference value between the edge length of the first axial edge and the edge length of the third axial edge are both greater than a third distance threshold, determining that the reference rectangular solid is transformed into a roof-like rectangular solid.

7. The method according to claim 2, wherein after the obtaining distance relations between the respective vertices and the center coordinate point, the method further comprises:

obtaining a geometric center point of the target collision body when it is determined that the target collision body is a non-reference rectangular solid;

obtaining connecting line distances from the various vertices on the target collision body to the geometry central point;

recognizing the target collision body as a cylinder when difference values between the various connecting line distances are less than a third threshold, the regular geometry object comprising the cylinder; and constructing a spatial function of the cylinder according to coordinates of the geometric center point and a radius of the cylinder, the vertex data comprising the spatial function of the cylinder.

8. The method according to claim 2, wherein before the transforming vertex data of the target collision body according to a data format that matches the regular geometry object, the method further comprises:

splitting the target collision body by using equidistant bounding boxes, to obtain a plurality of collision sub-bodies;

determining intersection points of connecting lines between the various vertices on the target collision body and the various collision sub-bodies in the plurality of collision sub-bodies;

performing converge combination on the intersection points in each collision sub-body in sequence to obtain a bounding sub-box corresponding to the collision sub-body;

traversing the various bounding sub-boxes, and merging bounding sub-boxes with size difference values less than a fourth threshold, to obtain a bulk bounding box corresponding to the target collision body; and taking vertex data of the bulk bounding box as the vertex data of the target collision body.

9. The method according to claim 1, wherein the regular geometry object comprises a plurality of regular sub-geometries, the method further comprising:

determining sizes of the regular sub-geometries;

merging two adjacent regular sub-geometries when a difference value between the sizes of the two adjacent regular sub-geometries is less than a fifth threshold; and when a difference value between a size of a first regular sub-geometry and a size of a second regular sub-geometry in the plurality of rule sub-geometries is less than a sixth threshold, and the first regular sub-geometry is located inside the second regular sub-geometry, culling the first regular sub-geometry.

10. An electronic device, comprising a memory and a processor, the memory storing a computer program that, when executed by the processor, causes the electronic device to perform a collision data processing method including:

determining a target collision body in a virtual scene, the target collision body being a convex polyhedron having vertices and edges;

obtaining distance relations between a plurality of edges respectively connected to each vertex on the target collision body when a quantity of the vertices on the target collision body reaches a first threshold, the distance relations characterizing a shape feature of the target collision body:

determining, when the distance relations indicate that three edges connected to one target vertex in the target collision body are perpendicular to one another, that the target collision body is to be transformed into a standard rectangular solid; and transforming the target collision body into a regular geometry object comprising the standard rectangular solid according to the distance relations and a data format that matches the regular geometry object, wherein the regular geometry object is configured to obtain collision data of the target collision body when the target collision body collides with another virtual object in the virtual scene.

11. The electronic device according to claim 10, wherein the obtaining distance relations between a plurality of edges respectively connected to each vertex on the target collision body when a quantity of the vertices on the target collision body reaches a first threshold comprises:

determining a center coordinate point of the vertices on the target collision body when the quantity of the vertices on the target collision body reaches the first threshold;

obtaining distance relations between the respective vertices and the center coordinate point; and before the transforming vertex data of the target collision body according to a data format that matches the regular geometry object, the method further comprises:

when the distance relations indicate that respective distances between the various vertices and the center coordinate point are less than a first distance threshold, determining that the target collision body is recognized as a reference rectangular solid, the regular geometry object comprising the reference rectangular solid, and the reference rectangular solid being a structure similar to that of a standard rectangular solid; and when determining at least two groups of parallel surfaces according to the distance relations of the various vertices, determining that the target collision body is recognized as a reference rectangular solid.

12. The electronic device according to claim 10, wherein the regular geometry object comprises a plurality of regular sub-geometries, the method further comprising:

determining sizes of the regular sub-geometries;

merging two adjacent regular sub-geometries when a difference value between the sizes of the two adjacent regular sub-geometries is less than a fifth threshold; and when a difference value between a size of a first regular sub-geometry and a size of a second regular sub-geometry in the plurality of rule sub-geometries is less than a sixth threshold, and the first regular sub-geometry is located inside the second regular sub-geometry, culling the first regular sub-geometry.

13. The electronic device according to claim 11, wherein after the obtaining distance relations between the respective vertices and the center coordinate point, the method further comprises:

obtaining a geometric center point of the target collision body when it is determined that the target collision body is a non-reference rectangular solid;

obtaining connecting line distances from the various vertices on the target collision body to the geometry central point;

recognizing the target collision body as a cylinder when difference values between the various connecting line distances are less than a third threshold, the regular geometry object comprising the cylinder; and constructing a spatial function of the cylinder according to coordinates of the geometric center point and a radius of the cylinder, the vertex data comprising the spatial function of the cylinder.

14. The electronic device according to claim 11, wherein before the transforming vertex data of the target collision body according to a data format that matches the regular geometry object, the method further comprises:

splitting the target collision body by using equidistant bounding boxes, to obtain a plurality of collision sub-bodies;

determining intersection points of connecting lines between the various vertices on the target collision body and the various collision sub-bodies in the plurality of collision sub-bodies;

performing converge combination on the intersection points in each collision sub-body in sequence to obtain a bounding sub-box corresponding to the collision sub-body;

traversing the various bounding sub-boxes, and merging bounding sub-boxes with size difference values less than a fourth threshold, to obtain a bulk bounding box corresponding to the target collision body; and taking vertex data of the bulk bounding box as the vertex data of the target collision body.

15. A non-transitory computer-readable storage medium, storing a computer program that, when executed by a processor of an electronic device, causes the electronic device to perform a collision data processing method including:

determining a target collision body in a virtual scene, the target collision body being a convex polyhedron having vertices and edges;

obtaining distance relations between a plurality of edges respectively connected to each vertex on the target collision body when a quantity of the vertices on the target collision body reaches a first threshold, the distance relations characterizing a shape feature of the target collision body:

determining, when the distance relations indicate that three edges connected to one target vertex in the target collision body are perpendicular to one another, that the target collision body is to be transformed into a standard rectangular solid; and transforming the target collision body into a regular geometry object comprising the standard rectangular solid according to the distance relations and a data format that matches the regular geometry object, wherein the regular geometry object is configured to obtain collision data of the target collision body when the target collision body collides with another virtual object in the virtual scene.

16. The non-transitory computer-readable storage medium according to claim 15, wherein the regular geometry object comprises a plurality of regular sub-geometries, the method further comprising:

determining sizes of the regular sub-geometries;

merging two adjacent regular sub-geometries when a difference value between the sizes of the two adjacent regular sub-geometries is less than a fifth threshold; and when a difference value between a size of a first regular sub-geometry and a size of a second regular sub-geometry in the plurality of rule sub-geometries is less than a sixth threshold, and the first regular sub-geometry is located inside the second regular sub-geometry, culling the first regular sub-geometry.

17. The non-transitory computer-readable storage medium according to claim 15, wherein the obtaining distance relations between a plurality of edges respectively connected to each vertex on the target collision body when a quantity of the vertices on the target collision body reaches a first threshold comprises:

determining a center coordinate point of the vertices on the target collision body when the quantity of the vertices on the target collision body reaches the first threshold;

obtaining distance relations between the respective vertices and the center coordinate point; and before the transforming vertex data of the target collision body according to a data format that matches the regular geometry object, the method further comprises:

when the distance relations indicate that respective distances between the various vertices and the center coordinate point are less than a first distance threshold, determining that the target collision body is recognized as a reference rectangular solid, the regular geometry object comprising the reference rectangular solid, and the reference rectangular solid being a structure similar to that of a standard rectangular solid; and when determining at least two groups of parallel surfaces according to the distance relations of the various vertices, determining that the target collision body is recognized as a reference rectangular solid.

18. The non-transitory computer-readable storage medium according to claim 17, wherein after the determining that the target collision body is recognized as a reference rectangular solid, the method further comprises:

obtaining a first volume value corresponding to the target collision body, and a second volume value corresponding to the reference rectangular solid;

determining a ratio of the first volume value to the second volume value; and when the ratio reaches a second threshold, determining that the target collision body is transformed into the reference rectangular solid.

19. The non-transitory computer-readable storage medium according to claim 17, wherein after the obtaining distance relations between the respective vertices and the center coordinate point, the method further comprises:

obtaining a geometric center point of the target collision body when it is determined that the target collision body is a non-reference rectangular solid;

obtaining connecting line distances from the various vertices on the target collision body to the geometry central point;

recognizing the target collision body as a cylinder when difference values between the various connecting line distances are less than a third threshold, the regular geometry object comprising the cylinder; and constructing a spatial function of the cylinder according to coordinates of the geometric center point and a radius of the cylinder, the vertex data comprising the spatial function of the cylinder.

20. The non-transitory computer-readable storage medium according to claim 17, wherein before the transforming vertex data of the target collision body according to a data format that matches the regular geometry object, the method further comprises:

splitting the target collision body by using equidistant bounding boxes, to obtain a plurality of collision sub-bodies;

determining intersection points of connecting lines between the various vertices on the target collision body and the various collision sub-bodies in the plurality of collision sub-bodies;

performing converge combination on the intersection points in each collision sub-body in sequence to obtain a bounding sub-box corresponding to the collision sub-body;

traversing the various bounding sub-boxes, and merging bounding sub-boxes with size difference values less than a fourth threshold, to obtain a bulk bounding box corresponding to the target collision body; and taking vertex data of the bulk bounding box as the vertex data of the target collision body.

* * * * *